No. 894,958. PATENTED AUG. 4, 1908.
C. C. KEYSER.
FRICTION DRIVE MECHANISM FOR MOTOR CARS.
APPLICATION FILED DEC. 16, 1907.
2 SHEETS—SHEET 1.
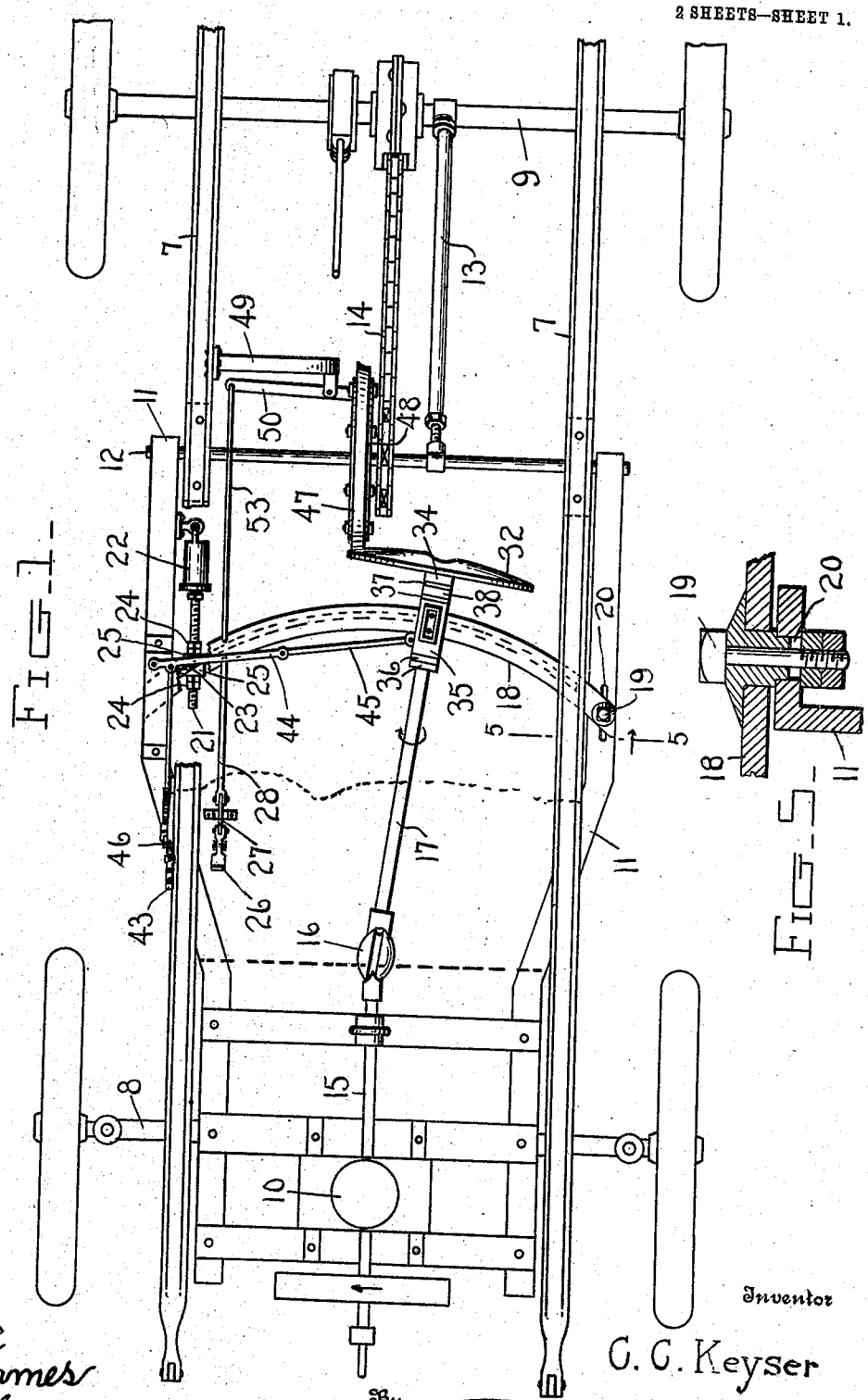
Witnesses
L. B. James
H. C. McCartney
Inventor
C. C. Keyser
By
Attorneys

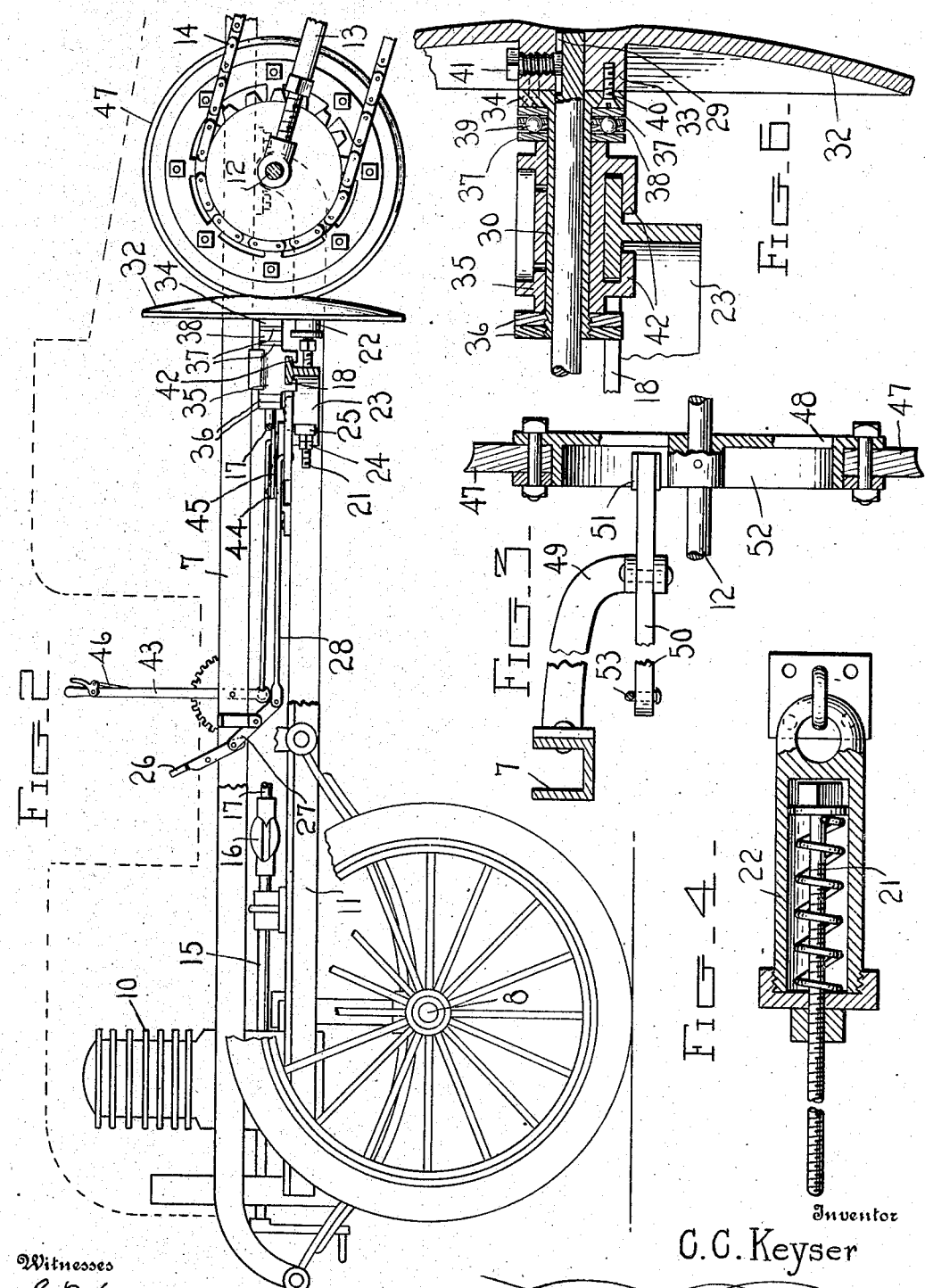

UNITED STATES PATENT OFFICE.

CHARLES C. KEYSER, OF WASHINGTON, DISTRICT OF COLUMBIA.

FRICTION DRIVE MECHANISM FOR MOTOR-CARS.

No. 894,958.        Specification of Letters Patent.        Patented Aug. 4, 1908.

Application filed December 16, 1907. Serial No. 406,710.

*To all whom it may concern:*

Be it known that I, CHARLES C. KEYSER, a citizen of the United States, residing at Washington, in the District of Columbia, have invented certain new and useful Improvements in Friction Drive Mechanisms for Motor-Cars; and I do hereby declare the following to be a full, clear, and exact description of the invention, such as will enable others skilled in the art to which it appertains to make and use the same.

The present invention has reference to improvements in friction drive mechanisms for motor cars, and it resides, generally in the provision of an exceedingly simple, readily operated, and efficient mechanism of that nature comprising a main swinging gear carried by a shaft pivoted to the shaft of the engine, and disposed in frictional contact with a relatively stationary secondary gear secured to the counter shaft of the car, whereby any change in the position of the swinging gear will vary its point of contact with the stationary gear, and will effect a resultant change in the speed at which the car is driven.

The invention further contemplates the provision of a brake mechanism connected with both of the above-mentioned gears and applied thereto simultaneously upon the movement of a single pedal, to which end the swinging gear is secured to a flanged carriage slidable upon the pivoted shaft and engaged with an arcuate guide pivoted at one end to the body of the car and connected at its free end with the pedal the guide being also connected at its free end to a shoe-carrying lever, whereby, when the pedal is depressed, the movement of the guide will slide the main gear and its carriage bodily upon the swinging shaft out of contact with the secondary gear, to whose rim the shoe is applied simultaneously with the movement of the main gear.

The invention still further resides in the particular construction of the gear carriage, and the guide upon which the carriage travels, and in the provision of means for yieldingly pressing the guide towards the secondary gear.

These and other features which form the subject matter of this case will be readily understood from a consideration of the following detailed description, and their preferred embodiment is illustrated in the accompanying drawings in which similar parts are designated by corresponding reference numerals in the several views.

Of the said drawings:—Figure 1 is a plan view of the mechanism applied to a motor car. Fig. 2 is a side elevation thereof, one of the side bars being broken away for clearness of illustration. Fig. 3 is an enlarged detail view of the shoe-carrying lever and the secondary gear, the latter being shown in section. Fig. 4 is an enlarged detail section through the casing of the spring-pressed bolt which connects the guide with one of the side bars of the supplemental frame. Fig. 5 is a similar section on the line 5—5 of Fig. 1 illustrating the pivotal mounting of the guide. Fig. 6 is an enlarged fragmental section through the main friction gear, and its carriage, showing also a portion of the guide upon which the carriage travels.

Referring more particularly to the drawings 7 designates generally, the main frame or body of the car, 8 and 9 the front and rear axles, and 10 the engine, which last-mentioned element is carried by a supplemental frame 11, the rear ends of whose side bars are provided with alining openings through which the ends of the counter-shaft 12 extend. The supplemental frame, however, forms the subject of and is described in detail in a separate application filed December 13, 1907, Serial No. 406,306. The rear axle is connected by a brace 13 with the counter-shaft in the usual manner and is driven from the latter by a chain and sprocket mechanism 14.

The shaft 15 of the engine is connected at its rear end by a universal joint 16 with a swinging shaft 17 which extends rearwardly across an arcuate guide 18 pivoted at one end to the adjacent side bar of the supplemental frame, the pivot bolt 19 extending through a longitudinal slot 20 formed in the side bar as shown in Fig. 5, thus permitting a certain adjustment of the guide with reference thereto. This guide which is bowed rearwardly of the frame is yieldingly forced in such direction by means of a spring-pressed bolt 21 whose headed end is fitted in a casing 22 linked to a plate bolted to the side face of the right hand side bar of the supplemental frame, said bolt extending through a depending flange 23 formed on the lower face of the guide, the guide being held in adjusted position with reference to said bolt by means of pairs of jam nuts 24 and beveled washers 25 disposed upon opposite sides of the flange 23.

The formation of the flange above referred to renders said guide approximately T-shaped in cross-section, said flange, however, terminating short of the pivoted end of the guide to permit a free movement thereof.

The guide is moved forwardly against the tension of the spring which surrounds the bolt 21 by means of a pedal 26 pivoted to the main frame, the lower end of the pedal being connected by a link 27 with a rod 28 which in turn is pivoted to the guide as shown in Figs. 1 and 2, said rod extending forwardly of the guide.

The rear end of the swinging shaft is key-seated as indicated by the numeral 29, and such end has fitted for sliding movement thereon a sleeve 30 and a convexo-concave friction gear 32, said gear having formed thereon an axial bushing 33 through which said shaft end likewise passes, the front face of the bushing contacting with an annular flange 34 which projects laterally from the sleeve and is formed integral therewith. The sleeve has mounted thereon a carriage 35, which is itself in the nature of a sleeve, being provided with an axial opening through which the sleeve 30 extends, said carriage being held against movement longitudinally thereof by a pair of lock nuts 36 fitted upon the threaded forward end of said sleeve, and a pair of steel plates 37 located adjacent the flange 34 and arranged in spaced relation to each other, a pair of race plates 38 being disposed between the plates 37, the race plates supporting anti-friction bearings 39. The friction gear 32 is connected with the sleeve 30 by a series of bolts 40 which pass through the flange 34 and the bushing of said gear, and with the shaft 17 by a bolt 41, the reduced end of whose shank passes through the bushing and extends into the key-seat 29, as shown in Fig. 6, said bolt thus serving as a key.

Owing to the extension of the bolt 41 into the key-seat the gear 32 will rotate with the said shaft during the revolution thereof, which movement is likewise imparted to the sleeve 30 by reason of its connection to said gear. The carriage 35, which is mounted upon the sleeve, is held against rotation by means of a pair of oppositely-disposed L-shaped flanges 42 formed on the bottom thereof and adapted for engagement with the horizontal arm or body of the guide 18 beneath the lower face of which said flanges extend.

The swinging movement of the shaft 17 is effected by means of a lever 43 which is likewise pivoted to the side bar of the main frame adjacent the free end of the guide and is connected by a pair of links 44 and 45 with the carriage 35, said links, owing to their pivotal connection with each other forming a toggle, as will be understood. By reason of this construction it will be apparent that when said lever is moved in one direction or the other the shaft 17 will be swung towards one side or the other of the machine. The swinging shaft is retained in adjusted position by a dog and rack mechanism 46, the dog being carried by the operating lever 43.

The friction gear 32 is adapted to engage a secondary friction gear which is carried by the counter-shaft 12, and comprises a ring 47 of friction material bolted to a flanged plate 48 as shown in Fig. 3, the rim of said ring being slightly concaved to permit a more complete contact thereof with the convex face of the main friction gear.

It will be apparent from the foregoing that when the pedal 26 is depressed, the resultant swinging movement of the guide 18 will effect a sliding movement of the main friction gear and its carriage forwardly of the shaft 17, thus withdrawing said gear from contact with the secondary gear. The invention, however, also contemplates the provision of means for braking the secondary friction gear simultaneously with the disengagement of the main gear therefrom, and to this end the right-hand side bar of the main frame has bolted thereto a horizontal L-shaped bracket 49 to which a lever 50 is pivoted intermediate its ends, the inner end of said lever carrying a brake-shoe 51 adapted to be moved into contact with the flange 52 of the plate 48, the other end of said lever being connected by a link 53 with the top portion of the guide 18, said link being disposed in virtual alinement with the link 28 which latter is in turn connected with the pedal.

The speed at which the car is driven can be accurately regulated by changing the position of the swinging gear with reference to the secondary gear, the movement of said swinging gear being effected approximately by that of the shaft 17 whose movement is controlled by the operating lever 43.

The concave formation of the rim of the friction ring permits the same to be properly engaged by the convex face of the main gear as will be understood, the latter and its carriage being forced yieldingly towards said ring by the spring pressed bolt 21.

The above described arrangement of parts permits the speed of the car to be accurately regulated, as already stated, and likewise permits the machine to be at once stopped short when necessary, the brake-shoe being applied to the secondary gear simultaneously with the disengagement of the main gear therefrom.

The upper portion of the carriage forms an oil-cup and is provided with ducts leading to the sleeve 30, by means of which the lubricant is supplied to the latter.

The fixed disposition of the secondary friction gear upon the counter-shaft permits the use of a connecting brace 13, or a series of such braces, beneath said shaft and the rear axle, which braces serve to take up all unnecessary spring and strain upon the counter-shaft, thus overcoming a defect hitherto present in all ordinary forms of friction drive transmissions in which the secondary gear is slidable upon the counter-shaft.

What is claimed is:—

1. The combination of a driving shaft and a driven shaft; a carriage slidable upon the driving shaft; a friction gear secured to said carriage; a friction gear secured to the driven shaft and adapted for contact with the first-mentioned gear; a pivoted arcuate guide connected intermediate its ends with said carriage; and means for swinging said guide bodily in one direction to impart a sliding movement to the carriage and the gear secured thereto, and withdraw the latter from contact with the last-mentioned gear.

2. The combination of a driving shaft; a pivoted guide; a carriage slidable upon the driving shaft and provided with flanges adapted for engagement with said guide; a friction gear secured to said carriage; a friction gear secured to the driven shaft and adapted for contact with the first-mentioned gear; and means for swinging said guide bodily in one direction to impart a sliding movement to the carriage and the gear secured thereto, and withdraw the latter from contact with the last-mentioned gear.

3. The combination of a pivoted driving shaft; a carriage slidable thereupon; a friction gear secured to said carriage; a driven shaft; a friction gear secured to the driven shaft and adapted for contact with the first-mentioned gear; a guide engaged with the carriage; means for swinging the pivoted shaft bodily along the guide, to change the point of contact between said gears; and separate means for moving said guide bodily away from the last-mentioned gear, to slide said carriage and its gear bodily along said shaft and withdraw said gear from contact with the last-mentioned gear.

4. The combination of a pivoted driving shaft; a carriage slidable thereupon; a friction gear secured to said carriage; a driven shaft; a friction gear secured to the driven shaft and adapted for contact with the first-mentioned gear; a pivoted guide engaged with the carriage; means for swinging the pivoted shaft bodily along the guide, to change the point of contact between the gears; and separate means for swinging said guide bodily away from the last-mentioned gear, to slide said carriage and its gear bodily along said shaft and withdraw said gear from contact with the last-mentioned gear.

5. The combination of a pivoted driving shaft; a carriage slidable thereupon; a friction gear secured to said carriage; a driven shaft; a friction gear secured to the driven shaft and adapted for contact with the first-mentioned gear; a pivoted guide engaged with the carriage; means for yieldingly forcing said guide bodily in one direction, to normally retain said gears in contact with each other; means for swinging the pivoted shaft bodily along the guide, to change the point of contact between said gears; and separate means for swinging said guide bodily in the opposite direction, to slide said carriage and its gear bodily along said shaft and withdraw said gear from contact with the last-mentioned gear.

6. The combination of a driving shaft and a driven shaft; a friction gear slidable upon the driving shaft; a friction gear secured to the driven shaft and adapted for contact with the first-mentioned gear; a brake disposed adjacent the last-mentioned gear; and a member connected with the sliding gear, and with the brake, for simultaneously withdrawing the sliding gear from engagement with the last-mentioned gear, and braking said last-mentioned gear.

7. The combination of a driving shaft and a driven shaft; a carriage slidable thereupon; a friction gear secured to said carriage; a friction gear secured to the driven shaft and adapted for contact with the first-mentioned gear; a brake disposed adjacent the last-mentioned gear; a pivoted member connected with said carriage and said brake; and means for swinging said member in one direction, to simultaneously withdraw the sliding gear from engagement with the last-mentioned gear, and brake the last-mentioned gear.

8. The combination of a pivoted driving shaft; a carriage mounted thereon; a friction gear secured thereto; a driven shaft; a friction gear secured to the driven shaft and adapted for contact with the first-mentioned gear; a lever; and a toggle joint between the lever and carriage for swinging the pivoted shaft bodily, to change the point of contact between the gears.

9. The combination of a driving shaft; a sleeve slidably mounted on one end of said shaft and rotatable therewith; a friction gear secured to said sleeve; a pivoted guide disposed beneath said shaft; a non-rotatable carriage mounted upon said sleeve and provided with depending flanges adapted for engagement with said guide; a driven shaft; a friction gear secured thereto and adapted for contact with the first-mentioned gear; and means for swinging said guide in one direction, to slide said carriage, sleeve, and gear bodily upon the driving shaft, to withdraw said gear from contact with the last-mentioned gear.

10. The combination of a pivoted driving shaft; a sleeve slidably mounted on one end of said shaft and rotatable therewith; a friction gear secured to said sleeve; a pivoted guide disposed beneath said shaft; a non-rotatable carriage mounted upon said sleeve and provided with depending flanges adapted for engagement with said guide; a driven shaft; a friction gear secured thereto and adapted for contact with the first-mentioned gear; means for swinging said guide in one direction, to slide said carriage, sleeve, and gear bodily upon the driving shaft, to withdraw said gear from contact with the last-mentioned gear; and a lever connected with said carriage, for swinging said driving shaft bodily in one direction or the other, to change the point of contact between the gears.

11. The combination of a driving shaft and a driven shaft; a sleeve slidably mounted upon the driving shaft and rotatable therewith; an annular flange formed upon said sleeve adjacent one end thereof; a friction disk provided with an annular bushing fastened directly to said flange; a non-rotatable carriage mounted upon said sleeve; antifriction bearings disposed between one end of said carriage and said flange; a friction gear secured to the driven shaft and adapted for contact with the first-mentioned gear; and a swinging member engaged with the carriage, for sliding the same and the sleeve upon the driving shaft in one direction or the other, to engage and disengage said gears.

In testimony whereof, I affix my signature, in presence of two witnesses.

CHARLES C. KEYSER.

Witnesses:
    H. C. McCarteney,
    Geo. H. Chandlee.